United States Patent
Kato

(10) Patent No.: US 9,222,794 B2
(45) Date of Patent: Dec. 29, 2015

(54) NAVIGATION APPARATUS

(71) Applicant: DENSO CORPORATION, Kariya, Aichi-pref. (JP)

(72) Inventor: Seiji Kato, Toyota (JP)

(73) Assignee: DENSO CORPORATION, Kariya (JP)

(*) Notice: Subject to any disclaimer, the term of this patent is extended or adjusted under 35 U.S.C. 154(b) by 355 days.

(21) Appl. No.: 13/687,029

(22) Filed: Nov. 28, 2012

(65) Prior Publication Data

US 2015/0025802 A1  Jan. 22, 2015

(30) Foreign Application Priority Data

Dec. 9, 2011 (JP) ................................ 2011-269934

(51) Int. Cl.
  *G01C 21/28* (2006.01)
  *G01C 21/36* (2006.01)
  *G01C 21/32* (2006.01)

(52) U.S. Cl.
  CPC ............ *G01C 21/3626* (2013.01); *G01C 21/32* (2013.01); *G01C 21/3697* (2013.01)

(58) Field of Classification Search
  None
  See application file for complete search history.

(56) References Cited

U.S. PATENT DOCUMENTS

| | | | |
|---|---|---|---|
| 8,620,532 B2 * | 12/2013 | Curtis et al. | 701/50 |
| 8,660,794 B2 * | 2/2014 | Currie et al. | 701/532 |
| 8,825,400 B2 * | 9/2014 | Kanematsu et al. | 701/532 |
| 2002/0156572 A1 * | 10/2002 | Bullock et al. | 701/209 |
| 2005/0102098 A1 * | 5/2005 | Montealegre et al. | 701/209 |
| 2008/0021638 A1 * | 1/2008 | Kobayashi | 701/208 |
| 2009/0138193 A1 * | 5/2009 | Katou | 701/201 |
| 2010/0250124 A1 * | 9/2010 | Shikimachi | 701/208 |
| 2010/0324752 A1 * | 12/2010 | Suganuma et al. | 701/1 |
| 2011/0172913 A1 * | 7/2011 | Nakamura et al. | 701/208 |
| 2011/0224893 A1 * | 9/2011 | Scofield et al. | 701/119 |
| 2011/0238294 A1 * | 9/2011 | Shikimachi et al. | 701/201 |
| 2011/0276263 A1 * | 11/2011 | Shimotani et al. | 701/200 |
| 2012/0143495 A1 * | 6/2012 | Dantu | 701/428 |
| 2012/0197525 A1 * | 8/2012 | Noro et al. | 701/437 |

(Continued)

FOREIGN PATENT DOCUMENTS

| | | |
|---|---|---|
| JP | A-06-088733 | 3/1994 |
| JP | 2005-172578 A | 6/2005 |

(Continued)

OTHER PUBLICATIONS

Ford Motor Company, 2006 Lincoln Navigator—Owner Guide 2$^{nd}$ Printing.*

(Continued)

*Primary Examiner* — Thomas Tarcza
*Assistant Examiner* — Richard Goldman
(74) *Attorney, Agent, or Firm* — Posz Law Group, PLC

(57) ABSTRACT

A navigation apparatus includes a control unit for determining whether an approach route to a branch point, which is a route guidance object, and an exit route from the branch point correspond to a learned road link of a learned road data. The control unit provides a normal guidance, instructing a progress direction guidance for the branch point, when none of the approach and exit routes is determined to correspond to a learned road link. Alternatively, the control unit provides a learned road guidance, which is different from the normal guidance, when at least one of the approach route and the exit route is determined to correspond to a learned road link, where the learned road guidance reflects the learned road link in the route guidance.

11 Claims, 10 Drawing Sheets

(56) References Cited

U.S. PATENT DOCUMENTS

| | | | |
|---|---|---|---|
| 2012/0232789 A1* | 9/2012 | Nakamura | 701/430 |
| 2013/0013194 A1* | 1/2013 | Tsutsumi et al. | 701/430 |
| 2013/0024104 A1* | 1/2013 | Stahlin | 701/409 |
| 2013/0096829 A1* | 4/2013 | Kato et al. | 701/533 |
| 2013/0138345 A1* | 5/2013 | Sakaguchi et al. | 701/533 |
| 2013/0166205 A1* | 6/2013 | Ikeda et al. | 701/533 |
| 2013/0166206 A1* | 6/2013 | Sato | 701/533 |
| 2013/0173158 A1* | 7/2013 | Shimomura et al. | 701/533 |
| 2013/0282273 A1* | 10/2013 | Tanaka et al. | 701/428 |
| 2014/0095071 A1* | 4/2014 | Srikanteswara et al. | 701/533 |
| 2014/0288765 A1* | 9/2014 | Elwart et al. | 701/32.4 |
| 2015/0025802 A1* | 1/2015 | Kato | 701/532 |

FOREIGN PATENT DOCUMENTS

| | | |
|---|---|---|
| JP | A-2006-125883 | 5/2006 |
| JP | 2010-203982 A | 9/2010 |
| JP | 2011-007504 A | 1/2011 |
| JP | 2011-089977 A | 5/2011 |

OTHER PUBLICATIONS

Office action dated Feb. 18, 2014 in the corresponding JP application No. 2011-269934 (and English translation).

Office Action mailed Aug. 19, 2014 issued in corresponding JP patent application No. 2011-269934 (and English translation).

U.S. Appl. No. 13/659,584, filed Oct. 24, 2012, Tanaka et al.

U.S. Appl. No. 13/537,505, filed Jun. 29, 2012, Tsutsumi et al.

* cited by examiner

NAVIGATION APPARATUS

CROSS REFERENCE TO RELATED APPLICATION

The present application is based on and claims the benefit of priority of Japanese Patent Application No. 2011-269934, filed on Dec. 9, 2011, the disclosure of which is incorporated herein by reference.

TECHNICAL FIELD

The present disclosure generally relates to a navigation apparatus performing route guidance based on map data and road data that are acquired and learned through travel experiences of the vehicle.

BACKGROUND

Based on a trace of movements of a movable object such as a vehicle, a navigation apparatus learns a new road which is not registered in a ready-made map data. Such a navigation apparatus is conventionally disclosed in, for example, Japanese Patent Laid-Open No. H06-88733 (JP '733) and Japanese Patent Laid-Open No. 2006-125883 (JP '883). The road learn function is a function that learns a new road not registered in the map data, by generating a new road (i.e., a learned road) and storing it, based on the trace of the vehicle's movements from a point where a current vehicle position departed from an existing road of the map data to a point where the current vehicle position returned to the existing road.

In the prior art, the learned road links, which are based on the vehicle's travel experience, and the existing road links in the ready-made map data are evenly reflected, without distinction, to the contents of the route guidance, when the route guidance is provided for the user. However, when the learned roads are reflected in the route guidance, such learned roads may not necessarily be appropriate as a route guidance object, which is caused by the lack of reliability, or uncertainty, of the learned roads.

For instance, the data stored as the learned road link regarding the shape and/or the progress direction of such road may be different from the actual shape and/or direction due to its generation method nature, which is based on the vehicle's travel experience, or the trace of the vehicle movements. Therefore, in such case, the route guidance provided to the user may be different from what the user is actually experiencing, in terms of, for example, the provided shape of the branch point, thereby confusing the user rather than guiding.

SUMMARY

In an aspect of the present disclosure, a navigation apparatus uses ready-made map data and learned road data for providing route guidance during a travel of a subject vehicle. The learned road data includes information regarding a learned road link, which is detected by a learned road detector. The learned road link is a road that is not included as an existing road link stored in the ready-made map data.

The navigation apparatus of the present disclosure includes a branch classification unit and a route guide unit.

The branch classification unit determines whether an approach route to a branch point and an exit route from the branch point corresponds to a learned road link in the learned road data. The branch point is a linchpin position of the two routes and serves as a route guidance object. If both the approach route to the branch point and the exit route from the branch point are not learned road links, the route guide unit provides an existing road branch guidance. The existing road branch guidance provides a progress direction instruction at the branch point by using the existing road links of the ready-made map data.

On the other hand, if at least one of the approach route to the branch point and the exit route from the branch point is determined to be a learned road link, the route guide unit provides a learned road branch guidance. The learned road branch guidance, which is different from the existing road branch guidance, provides guidance information reflecting the learned road link of the learned road data.

According to the above, when at least one of the approach route to the route guidance object branch point and the exit route to the route guidance object branch point is a learned road link, the route guidance for the branch point provides different guidance information than a conventional route guidance that is provided for existing road link of the ready-made map data. In such manner, at the branch point having the learned road link connected thereto, in consideration of uncertainty of the connection state of such learned road link serving as the approach/exit route, the branch guidance is provided in a distinguishing manner from the conventional branch guidance.

BRIEF DESCRIPTION OF THE DRAWINGS

Other objects, features and advantages of the present disclosure will become more apparent from the following detailed description disposed with reference to the accompanying drawings, in which.

DETAILED DESCRIPTION

The embodiments of the present disclosure are described with reference to the drawings in the following. The following embodiments are illustrative and are not meant to limit the present disclosure in any way.

(Configuration of Navigation Apparatus)

Figure 1:
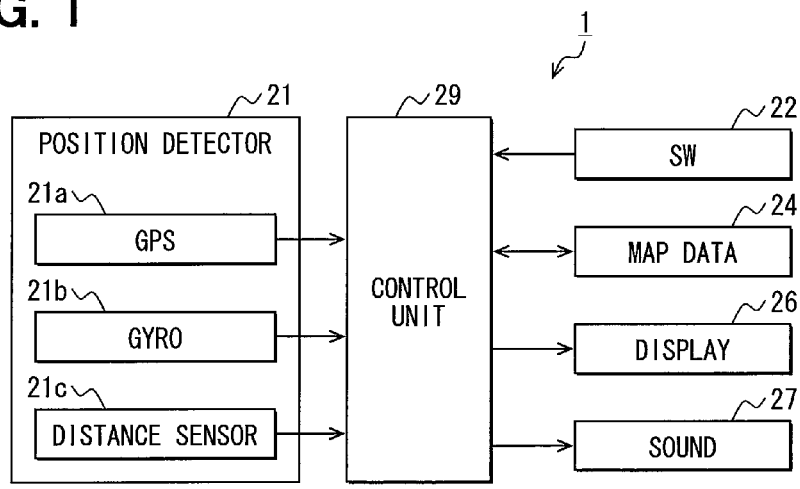
FIG. 1 is a block diagram a navigation apparatus in an embodiment of the present disclosure.

With reference to FIG. 1, a navigation apparatus 1 of the present embodiment may be a navigation system installed in a subject vehicle. The navigation apparatus 1 includes a position detector 21 to detect a current position of a subject vehicle, an operation switch group (SW) 22 to input various instructions from a user, a map data input unit 24 to input data from a storage that stores map data and/or programs, a display unit 26 to display various information, a sound output unit 27 to output various guide sounds, and a control unit 29.

The position detector 21 includes a Global Positioning System (GPS) receiver 21a that receives a signal from a GPS satellite and detects a position coordinate and an altitude of the subject vehicle. In addition, the position detector 21 includes a gyroscope 21b that outputs a detection signal according to an angular velocity of rotation motion of the subject vehicle, and a range sensor 21c that outputs a travel distance of the subject vehicle. The control unit 29 calculates a current position, a direction, a speed and the like of the subject vehicle based on an output signal from the GPS receiver 21a, the gyroscope 21b, and the range sensor 21c.

Further, the method of calculating the current position of the subject vehicle based on the output signal from the GPS receiver 21a may be implemented in various manners, such as a single point positioning method, a relative positioning method.

The operation switch group 22 includes a touch panel integrally disposed on a screen of the display unit 26 and a mechanical key positioned around the touch panel.

The map data input unit 24 is a device for inputting, to the control unit 29, data from a map data storage medium and/or a memory medium storing learn road data regarding a learned road acquired by a road learn function.

The map data storage medium stores ready-made map data provided by a map data provider. The ready-made map data may more practically be data including road data made up from links for connecting nodes and the nodes representing a point such as a branch point or the like, image data used for drawing backgrounds, map matching data, route guidance data, operation programs for the operation of the navigation apparatus 1, and design image data. Further, the ready-made map data may include the original map data and downloaded difference data, which represents the difference, or an update, of the original map data.

The memory medium for storing the learn road data may be a memory device of electrically/magnetically rewritable nature, which retains its memory even when the electric power supply is turned off, such as a hard disk, a flash memory. When a new road, which is non-existent in the pre-registered roads or already-learned roads, is detected by the road learn function of the navigation apparatus 1, learned road data of the new road is stored to the memory medium, and the new road becomes a learned road. The learned road data includes information of the road connection state and a shape of the link, where the road connection state is in regards to a node that is a connection point between the existing roads and the learned road and a link connecting two nodes.

The display unit 26 may be a color display unit having, for example, a liquid crystal display as its display screen, and is capable of displaying various images according to the input of the video signal from the control unit 29. The display unit 26 is used for displaying a guidance route from a departure place to a destination, a current vehicle position mark, and other guidance information together with other information. The sound output unit 27 is configured to output voice guidance or the like regarding various information. The display unit 26 and the sound output unit 27 are used to display images and to output voices for providing route guidance, such as a travel direction.

The control unit 29 is implemented as a computer having a CPU, a ROM, a RAM, an input/output and a bus line connecting those components in combination with other parts, for controlling the above-described parts. The control unit 29 performs various kinds of process based on the program and data retrieved from the ROM and/or the map data input unit 24. The control unit 29 may thereby correspond to a branch classification unit, a route guide unit, a return unit, a successive branch guidance unit, and a message consolidation unit, and in claims.

(Operation of the Navigation Apparatus)

Processes performed by the control unit 29 are described in the following.

Processes related to navigation may include a map display process and a route guidance process. The map display process detects the current position of the subject vehicle based on the detection signal from the position detector 21. Next the map display process generates a map image based on map data around the current position retrieved from the map data input unit 24 and displays the map image around the current position on the display unit 26.

Further, the control unit 29 displays, on top of the map image to be displayed on the display unit 26, a vehicle position mark for showing the current position of the subject vehicle, which is detected by a detection signal from the position detector 21. The vehicle position mark is controlled to move along the display as the subject vehicle travels on the road. In addition, the control unit 29 scrolls the map image.

Further, in the route guidance process, upon having an input of a destination from the user through operation of the operation switch group 22, the control unit 29 performs an optimum route search. Specifically, the control unit 29 searches for an optimum route to a destination from a departure place, which is set as the current position of the subject vehicle, based on the road data retrieved from the map data input unit 24. The display unit 26 displays the optimum route searched, which serves as a guidance route, on top of the map image. The control unit 29 outputs guidance information, such as a progress direction, as an image and/or a voice/sound at a position before a specific guidance point such as a branch on the guidance route, for guiding the subject vehicle along the route toward the destination.

Further, when the subject vehicle travels an area other than an existing road, which is registered in the ready-made map data (i.e., road data existing), or the learned road, which is already registered, the navigation apparatus 1 of the present embodiment generates, by using the road learn function, learned road data for the new road based on a trace of movements during such a travel. The new road and its corresponding learned road data is registered in the memory medium of the map data input unit 24 as a learned road data. The control unit 29 reads the learned road data registered in the memory medium and the road data existing in the map data, performs a process for keeping the consistency between the two kinds of data to be utilized as one map data, and utilizes the data for the map display process and the route guidance process.

More practically, the control unit 29 regularly identifies a current position of the subject vehicle by the position detector 21 during the travel of the subject vehicle. Based on a trace of the subject vehicle's movements from a position where the subject vehicle departs from a range of the existing road or a range of the learned roads already registered, to a point where the subject vehicle returns to the existing road or to the learned road, and the control unit 29 generates a learned road data for the new road.

The control unit 29 stores the learned road data to the memory medium. The learned road data includes information about the nodes including a connection point node that is a node representing a connection point of the learned road to the existing road (i.e., a departure point from, and a return point to the existing road) and connecting links of such node, as well as the connection state of the roads that are represented by the links between the nodes and collection of coordinates of the points that represent a road shape between the departure point and the return point.

Further, there may be at least two methods for correlating (i.e., keeping consistency) between the learned road data and the ready-made map data. Per the first method, when the learned road data is stored, the ready-made map data is updated by having a new connection point of the learned road link added to the existing road link or by dividing the existing road link, thereby establishing a correlation or connection between the learned road data and the ready-made map data.

Per the second method, when storing learned road data, which is acquired after a travel of the subject vehicle on a road that is non-existent in the existing map, a supplemental link data that connects or correlates the learned road link and the existing road link is generated, and the learned road data is stored together with the supplemental link data. When storing the supplemental link data, the road data of the ready-made map data in the navigation apparatus 1 will not have any change added thereto.

The supplemental link data is generated by using a base link that represents the existing road (i.e., a road having a departure point or a return point generated in a course of road learning) that is connected to the learned road, with other information regarding data of the existing, road such as road attributes and road shape. The supplemental link data generated in the above-described manner is utilized as data for defining a connection between the learned road link and the existing road link, in place of the base link. Details of the generation and utilization of the supplemental link data may be found in a prior application by the same inventor, which is filed under an application number JP-2011-051768.

(Branch Guidance Process)

Figure 2:
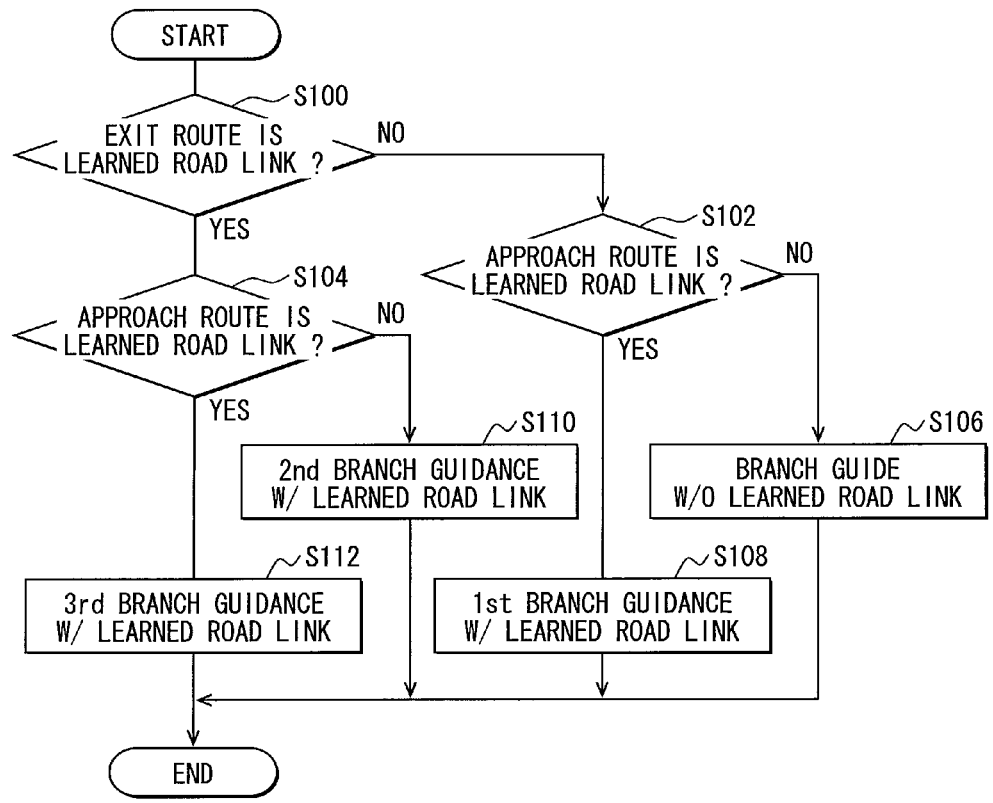
FIG. 2 is a flowchart of a branch guidance process.

With reference to FIG. 2, a branch guidance process performed by the control unit 29 is described in the following. The branch guidance process is a process started at a time when the subject vehicle arrives at a predetermined distance from a guidance object branch point (branch point hereinafter), which may be an intersection, a rotary, a junction and the like, during the execution of the route guidance process.

After a start of the branch guidance process by the control unit 29, the process, in S100, determines whether an exit route of the guidance route from the branch point is a learned road link. When the exit route from the branch point is a learned road link (S100:YES), the process proceeds to S104. Conversely, when the exit route from the branch point is not a learned road link (S100:NO), the process proceeds to S102.

The process, in S102, determines whether an approach route to the branch point is a learned road link. When the approach route to the branch point is a learned road link (S102:YES), the process proceeds to S108. On the other hand, when the approach route to the branch point is not a learned road link (S102:NO), the process proceeds to S106.

When the approach route to branch point is not a learned road link, the process, in S106, performs a normal guidance that does not consider a learned road link as a branch guide for the branch point, which the subject vehicle is approaching. In such guidance, a progress direction toward the exit route from the branch point is determined, and the progress direction is provided as guidance at a predetermined timing before the subject vehicle arrives at the branch point, through sound output, screen image or the like. The normal guidance may be same as the guidance from a conventional navigation apparatus.

When the approach route to the branch point is a learned road link, the process, in S108, performs a first branch guidance that reflects a learned road link as a branch guidance about the branch point concerned. Specifically, with reference to FIGS. 7A and 7B the first branch guidance is described in the following.

Figure 7A:
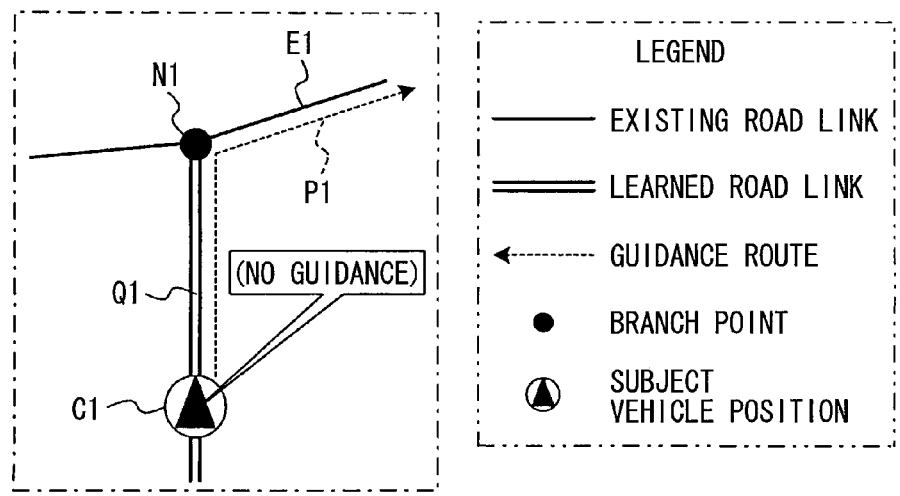
FIGS. 7A, 7B are illustrations of a first branch guidance of FIG. 2.
Figure 7B:
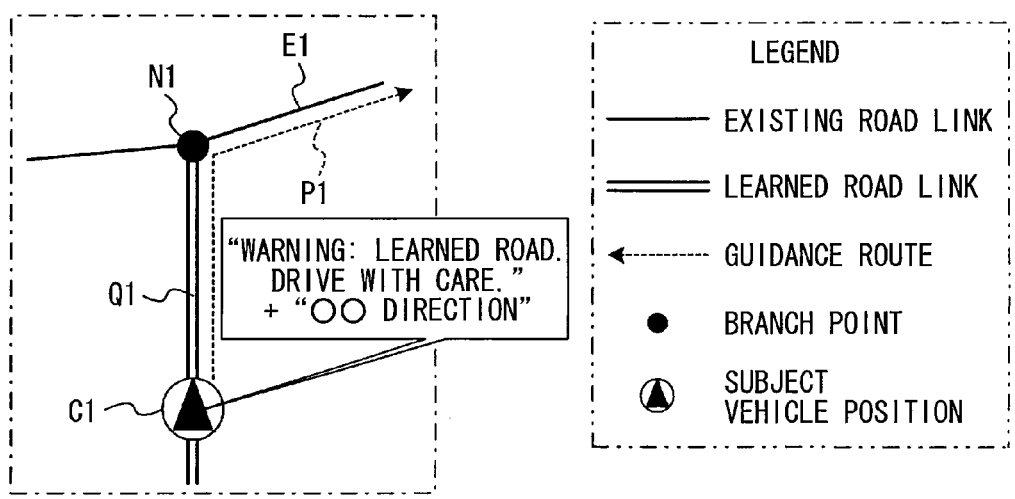

FIGS. 7A and 7B are examples of the first branch guidance performed for a guidance route P1 via a branch point N1. Per the guidance route P1, the subject vehicle approaches the branch point N1 from a learned road link Q1, which is the approach route, and the subject vehicle exits the branch point N1 to an existing road link E1, which is the exit route. A mark C1 represents a travel position or a current positioning of the subject vehicle. In this example, two guidance methods for the same situation are described.

In the guidance example of FIG. 7A, in consideration of the approach route to the branch point N1 being the learned road link Q1, no route guidance for the branch point N1 is performed. This is because the approach route is the learned road link Q1, and a shape and a progress direction of the road represented by the data of the learned road link may possibly be different from an actual road. Therefore, any possible inaccuracy in the route guidance due to the learned road link Q1 being different from the actual road is avoided.

Further, if a warning about the learned road is provided when the subject vehicle is traveling on on the learned road link Q1, it is not necessary to provide a warning again for the driver at a time of passing the branch point N1, since the driver is already aware of the learned road. The guidance (i.e., warning) at a time of traveling on the learned road link will be described later in detail.

In contrast, in the guidance example of FIG. 7B, in consideration of the approach route to the branch point N1 being the learned road link Q1, a warning (i.e., attention calling) message regarding the learned road such as "Warning: Traveling on a learned road. Drive with caution." may be provided to the user of the subject vehicle, and a guidance of a progress direction may be presented in the same manner as the normal guidance.

This idea of providing a normal guidance is used based on an assumption that the approach route of the learned road link Q1 is accurate. In addition, by providing a warning that that the learned road link Q1 may be different from the actual road, the attention of the user is directed to the situation that the route guidance includes a route having a learned road link.

Further, from among the above two examples, the guidance example of FIG. 7A may be provided for a user who prefers a hassle-free guidance, disliking frequent/repeated information provisions from the apparatus, and the guidance example of FIG. 7B may be provided for a user who prefers a detailed information provision.

Further, the user may select one of two guidance provision methods described above according to his/her preference.

Figure 8:
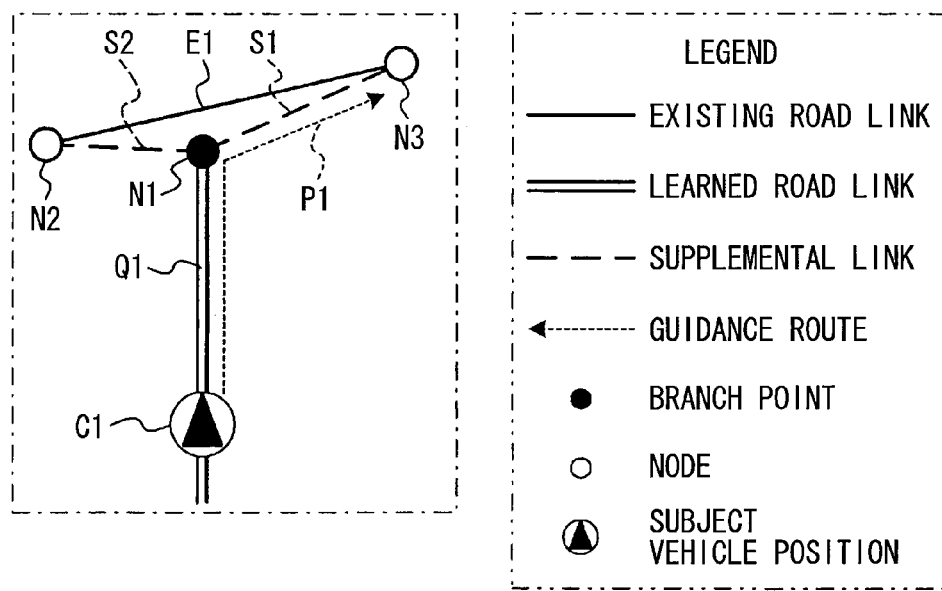
FIG. 8 is an illustration of a guidance route P1 of FIGS. 7A, 7B with supplemental links.

FIG. 8 is an example of the guidance route P1 of FIGS. 7A, 7B, with supplemental links. Specifically, the guidance route P1 via the branch point N1 from the approach route of the learned road link Q1 to the exit route of a supplemental link S1. Supplemental links S1, S2 are generated based on the existing road link E1 when the learned road link Q1 that is connected to the existing road link E1 is generated. That is, a base link of the supplemental links S1, S2 is the existing road link E1. The supplemental link S1 links (i.e., connects) the branch point node N1, which is a connection point between the existing road link E1 and the learned road link Q1, and one end node N3 of the existing road link E1. Further, the supplemental link S2 links the branch point node N1 and the other end node N2, which is the other end node of the existing road link E1. In consideration of the approach route to the branch point node N1, which is the learned road link Q1, the branch guidance may be performed in the same manner as the guidance examples of FIGS. 7A, 7B.

With continuing reference to FIG. 2, in S104, which is subsequent to a determination that the exit route from the branch point is a learned road link, the process determines whether an approach route to the branch point is a learned road link. When the approach route to the branch point is a learned road link (S104: YES), the process proceeds to S112. On the other hand, when the approach route to the branch point is not a learned road link (S104: NO), the process proceeds to S110.

In S110, which is subsequent to a determination that the approach route to the branch point is not a learned road link, the process performs a second branch guidance as a branch guidance about the branch point concerned, which reflects a learned road link to the branch guide. An example of the second branch guidance is provided with reference to FIGS. 9A and 9B.

Figure 9A:
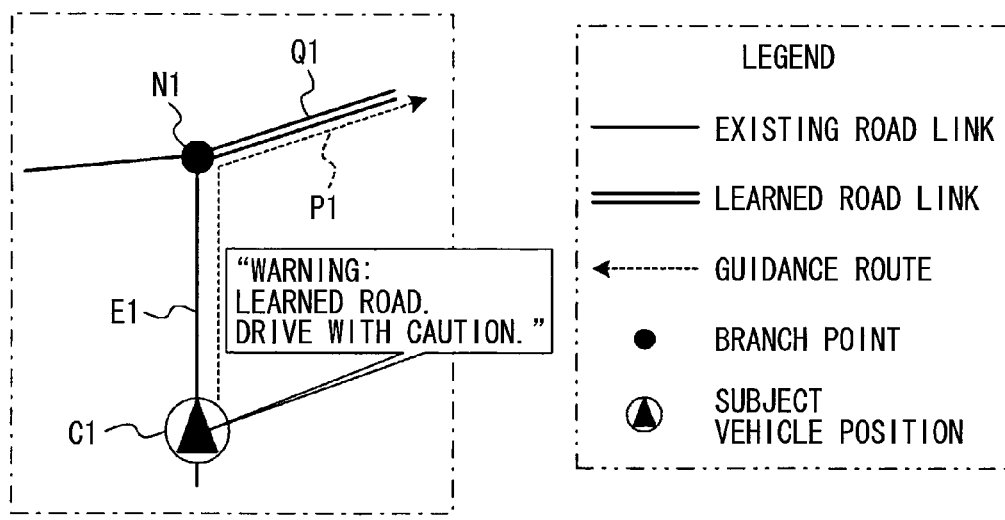
FIGS. 9A, 9B are illustrations of a second branch guidance of FIG. 2.
Figure 9B:
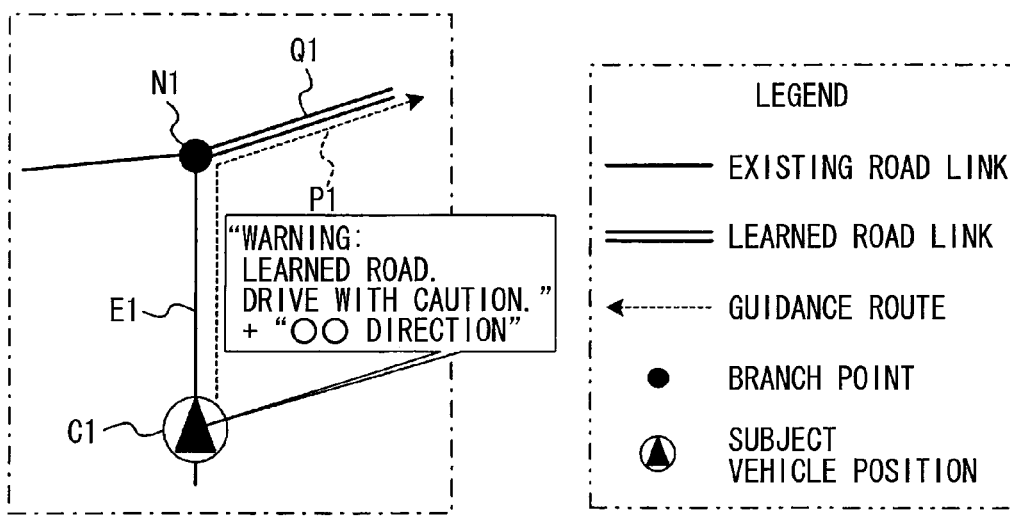

FIGS. 9A, 9B are examples of the second branch guidance performed for the guidance route P1 via the branch point N1 from the approach route of the existing road link E1 to the exit route of the learned road link Q1. In this case, two guidance methods for the same situation are described.

In the guidance example of FIG. 9A, in consideration of an approach route to the branch point N1 being the learned road link, a warning message regarding the learned road is provided for the user. However, a progress direction guidance at the branch point will not be provided. This is because there may be a possibility that a shape and/or a progress direction of the road represented by the data of the learned road link Q1 of the exit route in the course of progress from the existing road link E1 to the learned road link Q1 may be different from an actual road. Therefore, any possible inaccuracy in the route guidance due to the learned road link Q1 being different from the actual road is avoided.

On the other hand, by calling the driver's attention to the fact that the guidance route includes the learned road prior to the progress to the learned road link Q1, the driver recognizes that the road to be traveled thereafter may possibly be different from the actual road.

In contrast, in the guidance example of FIG. 9B, in consideration of the exit route from the branch point N1 being the learned road link, an attention calling message regarding the learned road is provided for the driver, together with the progress direction for the branch point that is same as the normal guidance. This idea of providing a normal guidance is used based on an assumption that the exit route of the learned road link Q1 is accurate, with a pre-caution for a possibility that the learned road link Q1 may be different from an actual road, thereby calling an attention of the driver to make sure that he/she is aware that the branch guide includes a route based on a learned road link.

Further, the guidance example of FIG. 9A may be provided for a user who prefers a hassle-free guidance, disliking frequent information provisions from the apparatus, and the guidance example of FIG. 9B may be provided for a user who prefers a detailed information provision.

Further, the user may, by oneself, select one of two guidance provision methods described above according to his/her preference.

Figure 10:
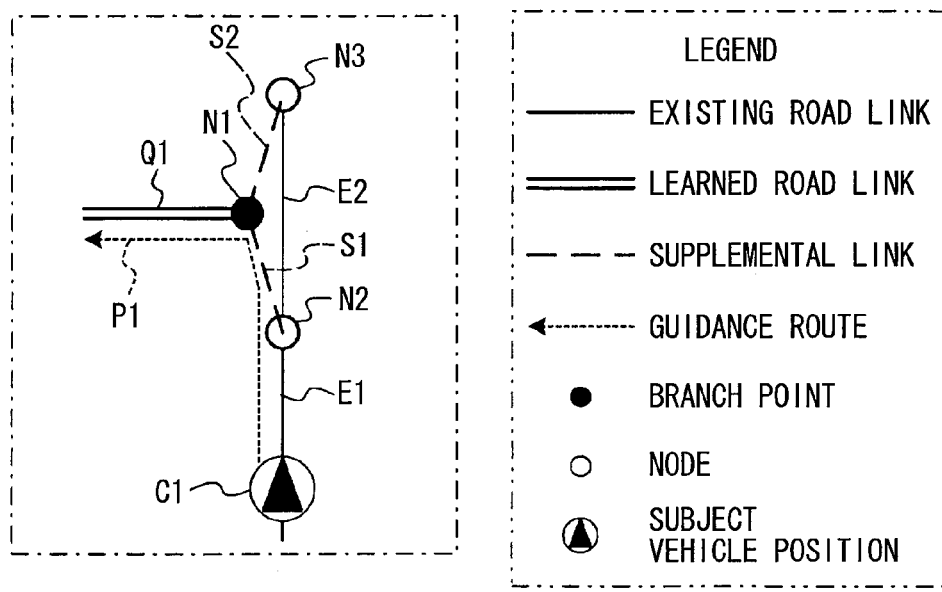
FIG. 10 is an illustration of a guidance route P1 of FIGS. 9A, 9B with supplemental links.

FIG. 10 is an example of the guidance route P1 of FIGS. 9A and 9B, but with supplemental links. Specifically the guidance route P1 via the branch point N1 from the approach route of the existing road link E2 to the exit route of the learned road link Q1. The supplemental links S1, S2 are generated based on the existing road link E2 when the learned road link Q1 that is connected to the existing road link E2 is generated. That is, a base link of the supplemental links S1, S2 is the existing road link E2. The supplemental link S1 links (i.e., connects) the branch point node N1, which is a connection point between the existing road link E2 and the learned road link Q1, and one end node N2 of the existing road link E2. Further, the supplemental link S2 links the branch point node N1 and the other end node N3, which is the other end node of the existing road link E2. In consideration of the exit route from the branch point node N1, which is the learned road link Q1, the branch guidance is performed in the same manner as the guidance examples of FIGS. 9A and 9B.

With continuing reference to FIG. 2, the process, in S112, which is subsequent to a determination that the approach route to the branch point is a learned road link, the process performs a third branch guidance as a branch guidance about the branch point concerned, which reflects a learned road link to the branch guidance. An example of the third branch guidance is described with reference to FIGS. 11A and 11B.

Figure 11A:
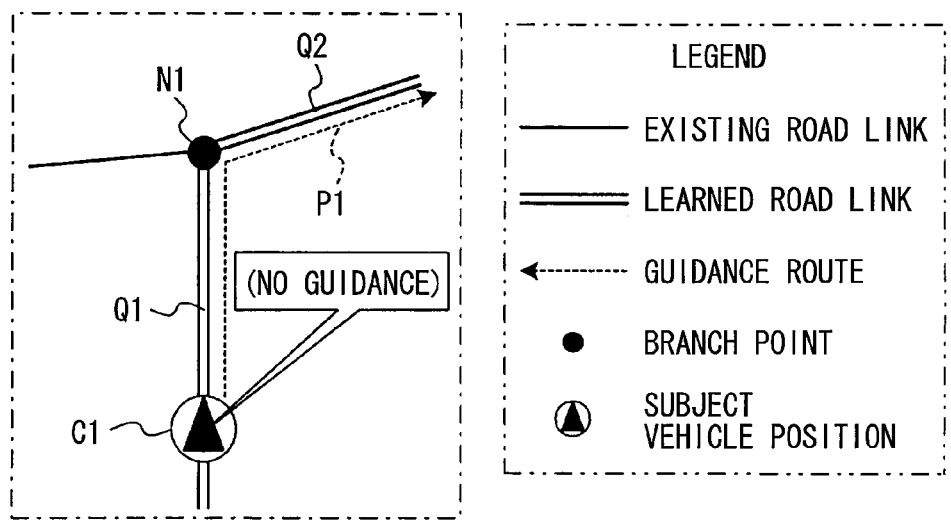
FIGS. 11A, 11B are illustrations of a third branch guidance of FIG. 2.
Figure 11B:
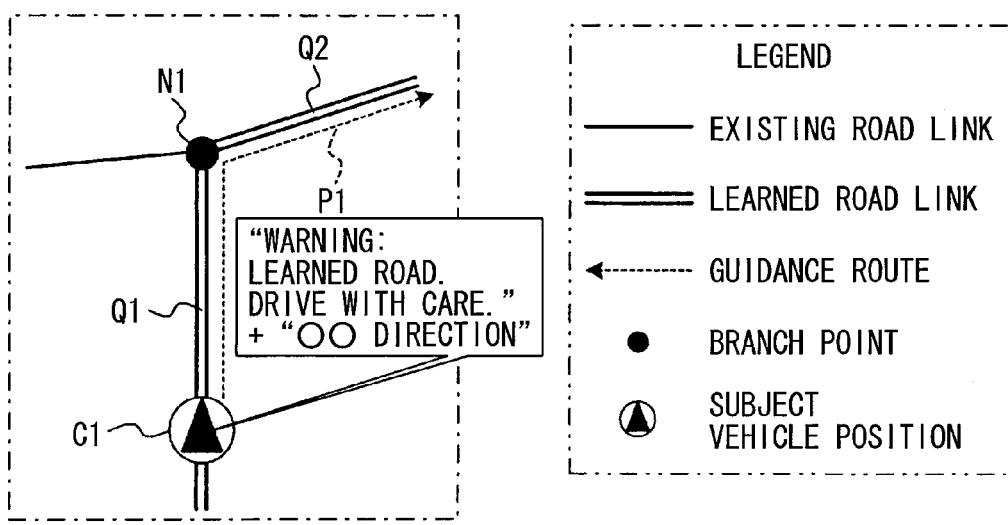

FIGS. 11A and 11B are examples of the third branch guidance performed for a guidance route P1 via a branch point N1 from the approach route of a learned road link Q1 to the exit route of a learned road link Q2. Further, a mark C1 represents a position of the subject vehicle. In this case, two guidance methods for the same situation are described.

In the guidance example of FIG. 11A, in consideration of the approach route to the branch point N1 and the exit route from the branch point N1 respectively being the learned road links Q1, Q2, no route guidance for the branch point N1 is performed. This is because both the approach route and the exit route are learned road links, and a shape and a progress direction of the road represented by the data of the learned road links may possibly be different from the actual road. Therefore, any possible inaccuracy in the route guidance due to the learned road links Q1, Q2 being different from the actual road is avoided.

Further, if a warning about the learned road is provided when the subject vehicle travels on the learned road link Q1, it is not necessary to provide a warning again for the driver at a time of passing the branch point N1, since the driver is already aware of traveling on the learned road.

In contrast, in the guidance example of FIG. 11B, in consideration of the approach and the exit route to and from the branch point N1 being the learned road links Q1, Q2, respectively, a warning message regarding the learned road is provided for the driver of the subject vehicle, and a guidance of a progress direction is provided in the same manner as the normal guidance.

This idea of providing a normal guidance is used based on an assumption that the approach route and the exit route of the learned road links Q1, Q2 are accurate. In addition, by providing a warning that that the learned road links Q1, Q2 may be different from the actual road, the attention of the user is directed to the situation that the route guidance includes a route having learned road links.

Further, the guidance example of FIG. 11A may be provided for a user who prefers a hassle-free guidance, disliking frequent information provisions from the apparatus, and the guidance example of FIG. 11B may be provided for a user who prefers a detailed information provision.

Further, the user may select one of two guidance provision methods according to his/her preference.

(Guidance Request Process)

Figure 3:
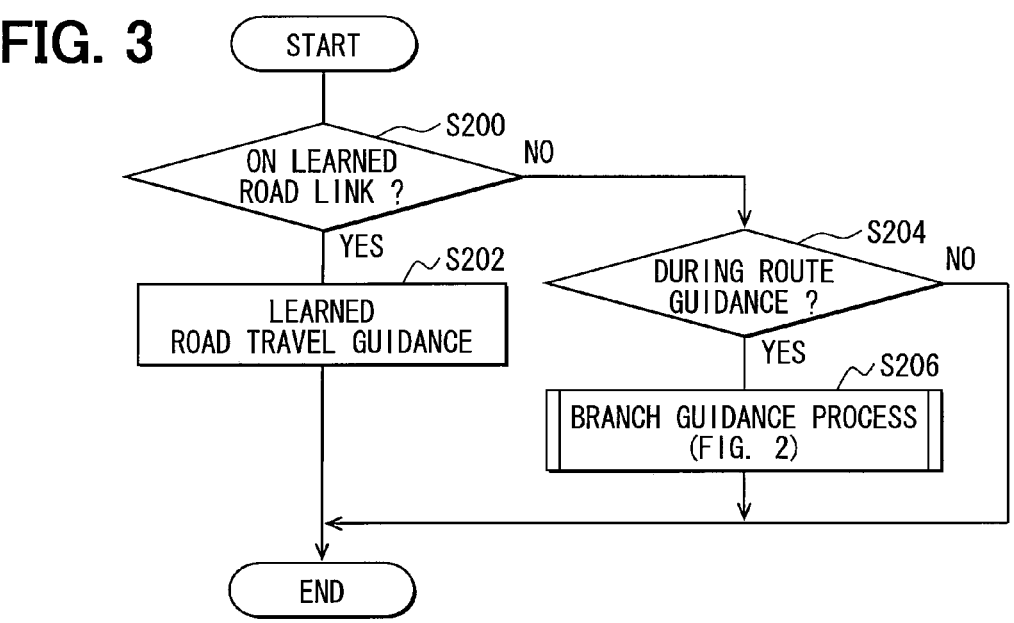
FIG. 3 is a flowchart of a guidance request process.

With reference FIG. 3, the control unit 29 performs the guidance request process of FIG. 3. The guidance request process is performed during the operation of the navigation apparatus 1, which is started by a user instruction accepted by the operation switch group 22 as an operation instruction for requesting a guidance request. Further, the guidance request is a function to provide guidance information about the closest route guidance point that is closest to the current vehicle position at a time of user operation of a certain operation switch.

In S200 of the guidance request process, the control unit 29 determines whether the current position of the subject vehicle is on a learned road link. When it is determined that the current position of the subject vehicle is on a learned road link (S200:YES), the process proceeds to S202. On the other hand, when it is determined that the current position of the subject vehicle is on a link other than a learned road link (S200:NO), the process proceeds to S204.

In S202, which is subsequent to a determination that the current position of the subject vehicle is on a learned road link, the process performs a learned road travel guidance, notifying that the subject vehicle is traveling on a learned road. An example of the learned road travel guidance is provided with reference to FIG. 12.

Figure 12:
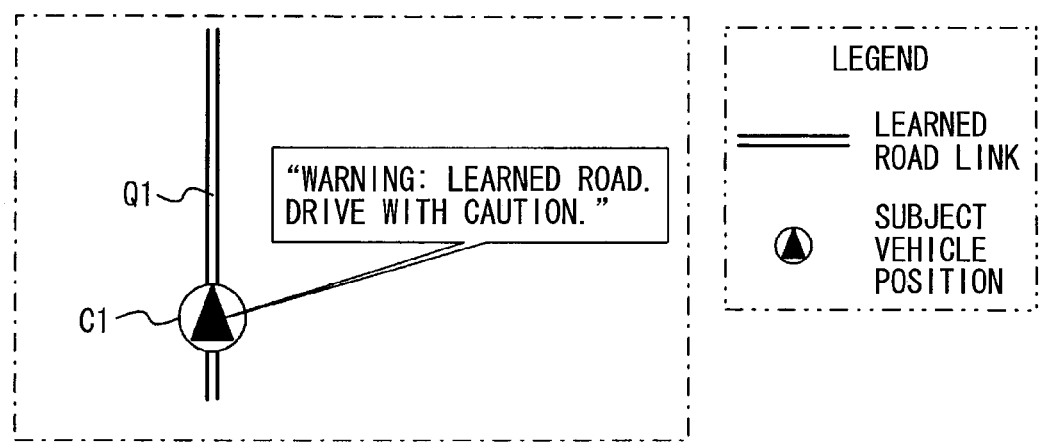
FIG. 12 is an illustration of the guidance request process of FIG. 3.

FIG. 12 is an example of the learned road travel guidance performed in a situation that the subject vehicle is traveling on a learned road link Q1. A mark C1 represents a travel position of the subject vehicle. In this situation, when the operation instruction about the guidance request is accepted from the user, a message notifying the user that the subject vehicle is currently traveling on the learned road, such as "Traveling on a learned road. Drive with caution" may be provided. By the provision of such message, the user is enabled to confirm that the subject vehicle is traveling on a learned road, and may recognize that there may be a possibility that the learned road may be different from an actual road. The learned road travel guidance is performed commonly for a time of providing the route guidance toward a destination and for a time of not providing such guidance.

With continuing reference to FIG. 3, in S204, which is subsequent to a determination that the current position of the subject vehicle is on a link other than a learned road link, the process determines whether a route guidance process toward a destination is currently being performed. When it is determined that the route guidance process is currently being performed (S204:YES), the branch guidance process of FIG. 2 is performed in S206 for the closest branch point on the guidance route from the current position, and the branch guidance for the closest branch point is provided based on the processing result. On the other hand, when it is determined that the route guidance process is not currently being performed (S204:NO), the process concludes itself.

(Travel Track Guidance Process)

Figure 4:
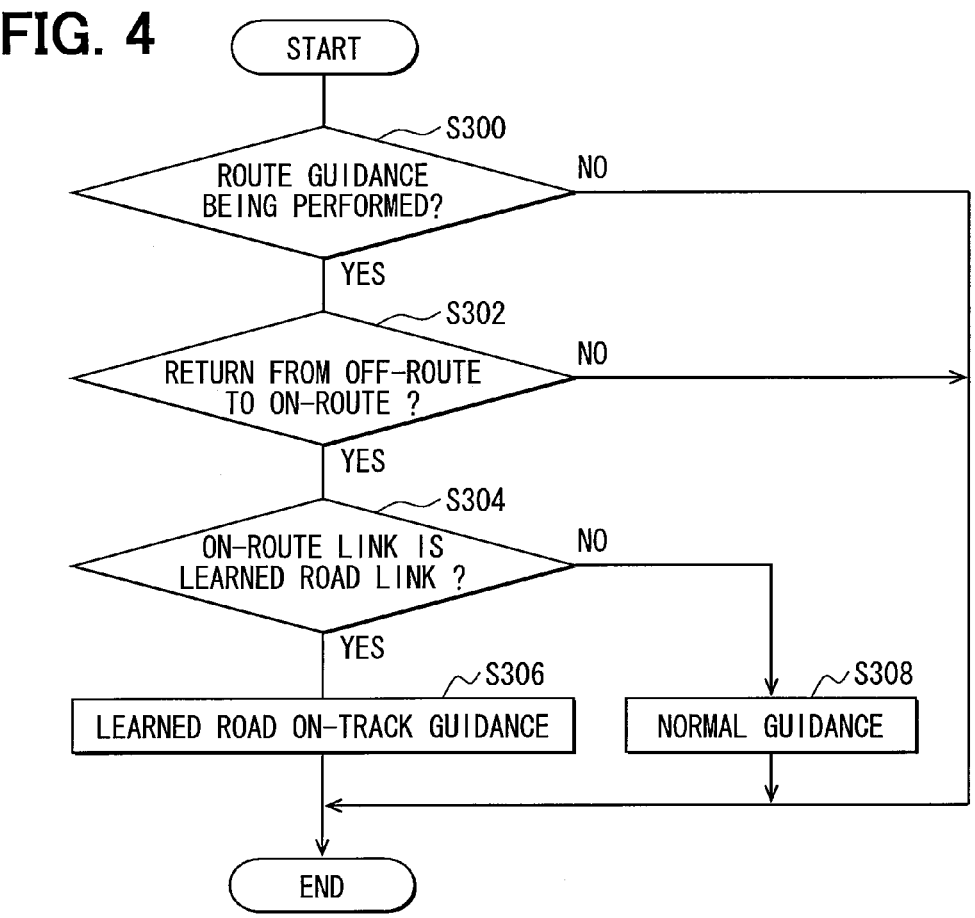
FIG. 4 is a flowchart of a travel track guidance process.

With reference to FIG. 4, the travel track guidance process is performed by the control unit 29 during the operation of the navigation apparatus 1, and is repeated at predetermined intervals.

The process, in S300, determines whether the route guidance process toward the destination is currently being performed. When the route guidance process is being performed (S300:YES), the process proceeds to S302. On the other hand, when the route guidance process is not being performed (S300:NO), the process concludes itself.

In S302, which is subsequent to a determination that the route guidance process is currently being performed, the process determines whether a current situation is a return situation. Specifically, the subject vehicle may be provided as being in an off-route state, where the subject vehicle is not following or is off the guidance route. In addition, the subject vehicle may also be provided as being in an on-route state, where the subject vehicle is traveling along or driving along the guidance route. Therefore, the return situation is when the subject vehicle goes from the off-route state to on-route state. When the process determines that the current situation is the return situation, returning from off-route to on-route (S302:YES), the process proceeds to S304. On the other hand, when it is determined that the current situation is not the return situation (S302:NO), the process concludes itself.

In S304, which is subsequent to a determination that the current situation is the return situation, the process determines whether the link of a return point where the subject vehicle has returned to the guidance route (i.e., an on-route point) is a learned road link. When the link of the on-route point is a learned road link (S304:YES), the process proceeds to S306. On the other hand, when the link of the on-route point is a link other than a learned road link (S304:NO), the process proceeds to S308.

In S306, which is subsequent to a determination that the link of the on-route point is a learned road link, the process performs a learned road on-track guidance for notifying the user that the on-route point is on a learned road. An example of the guidance performed by the learned road on-track guidance is described with reference to FIGS. 13A, 13B, where a mark C1 represents a travel position of the subject vehicle.

Figure 13A:
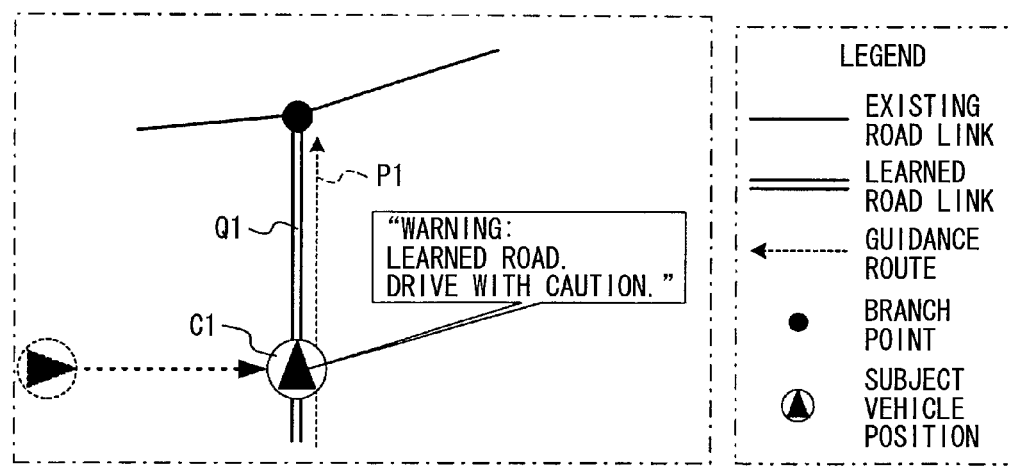
FIGS. 13A, 13B are illustrations of the travel track guidance process of FIG. 4.

FIG. 13A is an example of the learned road on-track guidance performed in the return situation during the route guidance process, where the subject vehicle is transitioning between two states. Specifically, the subject vehicle is transitioning from an off-route state, where the subject vehicle is off of the guidance route P1, to an on-route state, where the subject vehicle is traveling along the guidance route P1 on learned road link Q1, which is part of the guidance route P1. When the subject vehicle returns to the guidance route P1 at the learned road link Q1, a message notifying the user that the on-route point where the subject vehicle returned to the guidance route P1 is on a learned road. Such message may be provided as "Traveling on a learned road. Drive with caution." By providing such a message, the user may be able to confirm that the subject vehicle returned to the on-route state onto the learned road, and is alerted to the possibility that the learned road may be different from the actual road.

Figure 13B:
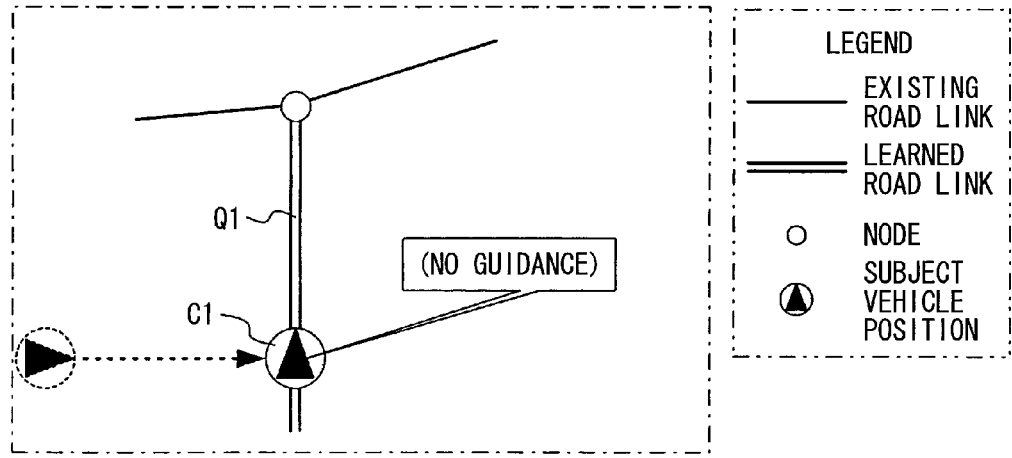

Further, as shown in FIG. 13B, when the subject vehicle is in a situation in which the route guidance process is not being performed (S300:NO), the guidance regarding the learned road will not be performed even when the subject vehicle returns to on-route state and onto the learned road link Q1.

With continuing reference to FIG. 4, in S308, which is subsequent to a determination that the link of the on-route point back on the guidance route is a link other than a learned road link, the process performs a normal guidance for the travel of the subject vehicle along the guidance route.

(Consecutive Guidance Process)

Figure 5:
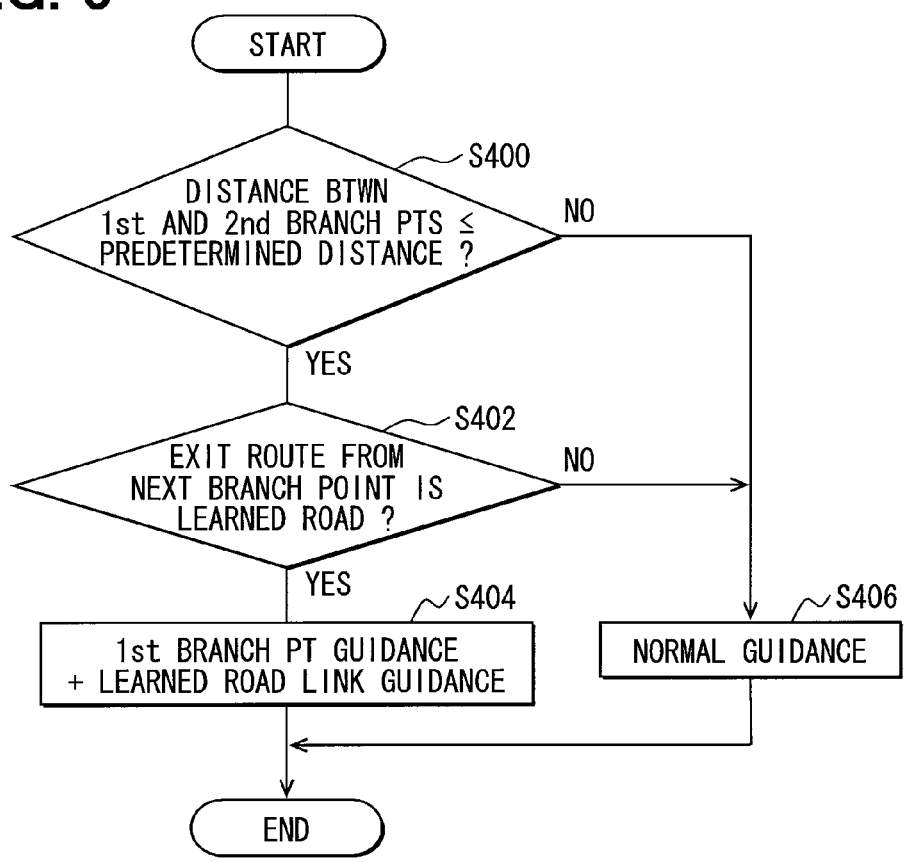
FIG. 5 is a flowchart of a consecutive guidance process.

With reference to FIG. 5, the consecutive guidance process is performed by the control unit 29 and is started when the subject vehicle arrives at a predetermined distance from a branch point that is an object of the route guidance (i.e., a guidance point) during route guidance.

In S400, the process determines whether a distance from a first branch point closest to the current position of the subject vehicle, which is an object of the route guidance, to a second branch point that is the next object of the route guidance is within a predetermined short distance (e.g., less than or equal to 800 m). When the distance from the first branch point to the second branch point is less than or equal to the predetermined short distance (S400:YES), the process proceeds to S402. On the other hand, when the distance from the first branch point to the second branch point is greater than the predetermined short distance (S400:NO), the process proceeds to S406.

In S402, which is subsequent to a determination that the distance from the first branch point to the second branch point is less than or equal to the predetermined short distance, the process determines whether an exit route from the second branch point is a learned road link. When the exit route from the second branch point is a learned road link (S402:YES), the process proceeds to S404. On the other hand, when the exit route from the second branch point is not a learned road link (S402:NO), the process proceeds to S406.

In S404, which is subsequent to a determination that the exit route from the second branch point is a learned road link, the process performs two guidance together. Specifically, the branch guidance for the first branch point and the learned road link guidance that notifies that the exit route from the second branch point is a learned road link. In such a case, the content of the branch guidance for the first branch point is determined by the branch guidance process (FIG. 2). An example of the guidance performed in S404 is provided with reference to FIG. 14.

Figure 14:
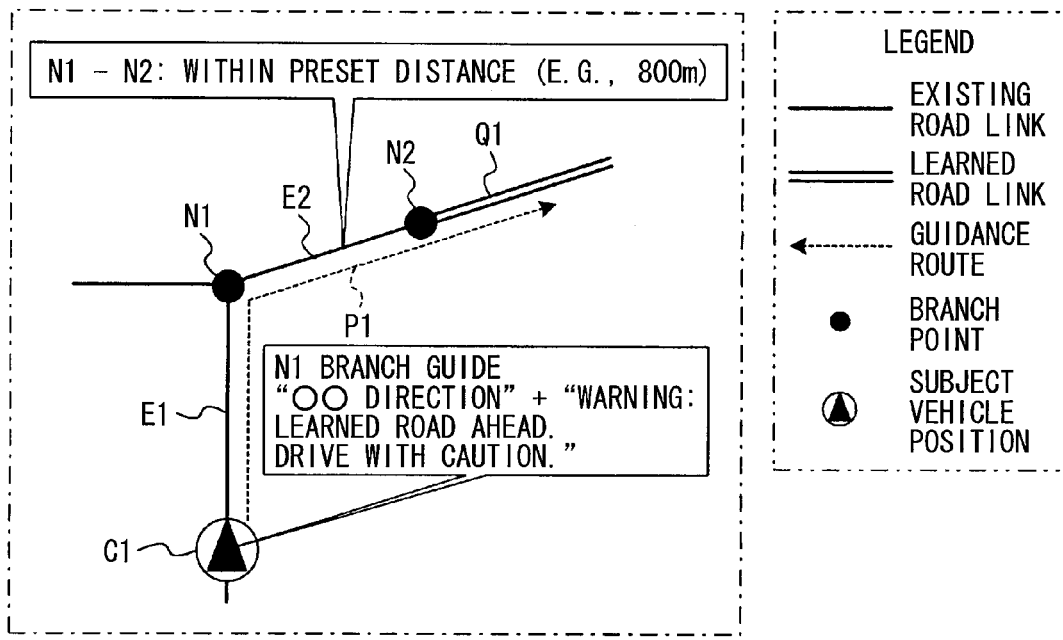
FIG. 14 is an illustration of the consecutive guidance process of FIG. 5.

FIG. 14 is an example of a branch guidance performed for the guidance route P1 via a branch point N1 and a branch point N2. A mark C1 represents a travel position of the subject vehicle. The subject vehicle approaches the branch point N1 from an approach route of an existing road link E1, and approaches the branch point N2 from an approach route of an existing road link E2. The subject vehicle then exits the branch point N2 to an exit route of the learned road link Q1. In this example, the distance between the first branch point and the second branch point is within 800 meters, leading to the affirmative determination of the condition in S400.

In this situation, the branch guidance for the first branch point N1 (e.g., a progress direction) is performed when the subject vehicle reaches a guidance point of the first branch point N1, together with a presentation of an attention calling message for calling an attention of the driver for the learned road at the second branch point N2 ahead of the branch point N1. The message for the driver may sound/look like "Warning: Learned road ahead. Drive with caution."

In a situation where two branch points that are respectively the objects of the branch guidance appear within a short distance, such as the distance between branch point N1 and N2, a warning message for the second branch point N2 is provided together with the branch guidance for the first branch point N1, thereby decreasing the number of guidance messages provided within a short time.

With continuing reference to FIG. 5, when the distance from the first branch point N1 to the second branch point N2 is greater than the predetermined short distance (S400:NO), or, when the exit route from the second branch point is not a learned road link (S402:NO), the process proceeds to S406, in which the process performs a normal guidance for the first branch point N1, not considering the learned road link of the second branch point N2.

(Consolidation Guidance Process)

Figure 6:
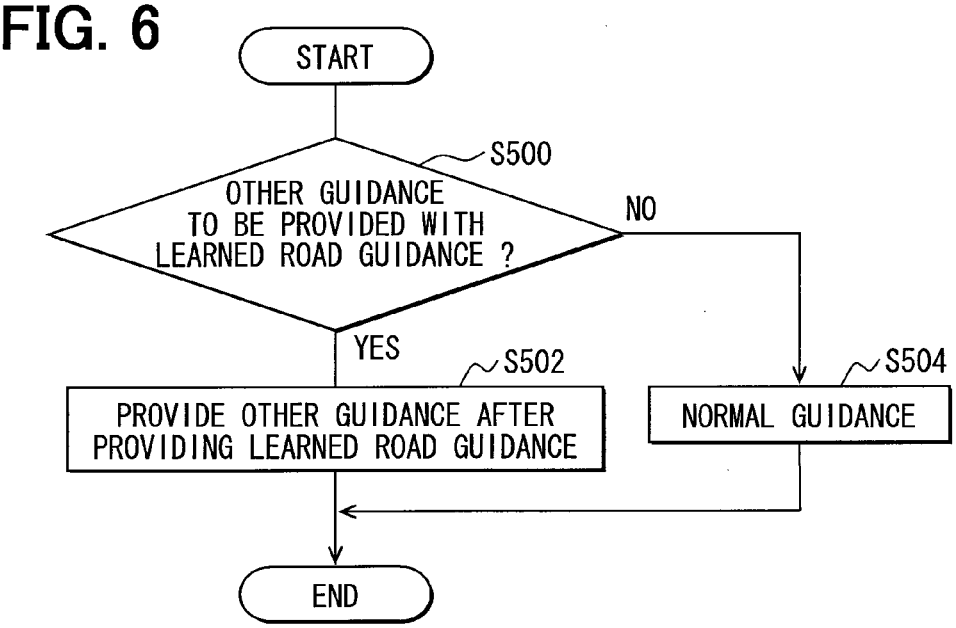
FIG. 6 is a flowchart of a consolidation guidance process.

With reference to FIG. 6, a consolidation guidance process is performed by the control unit 29 and is started when an information providing event for notifying a guidance about learned road links, such as a branch guidance, or a warning message for an on-route time is generated during a route guidance.

In S500, the process determines whether there is another information providing event that should be performed at the same time with the learned road link guidance. In other words, whether there is additional/other information that needs to be provided with the learned road guidance. When there is additional information (S500:YES), the process proceeds to S502. On the other hand, when there is no addition information (i.e., no other information provided event) (S500:NO), the process proceeds to S504, and performs the learned road link guidance concerned.

In S502, which is subsequent to a determination that there is additional information, the process performs the learned road link guidance first, and then performs guidance for providing the additional information. An example of such guidance is described with reference to FIG. 15.

Figure 15:
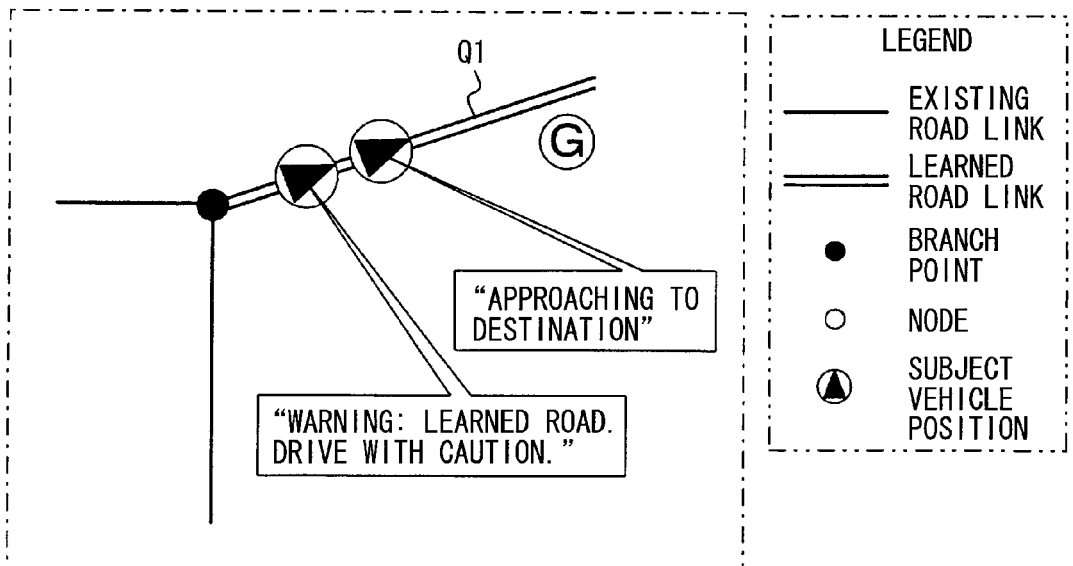
FIG. 15 is an illustration of the consolidation guidance process of FIG. 6.

FIG. 15 is an illustration of guidance procedure of two guidance messages that need to be provided, one of which is a warning message for calling an attention about the learned road link Q1, and the other is a message for notifying, for example, an approach to a destination G ahead of the learned road link Q1. In such situation, the two message provision timings is resolved by first providing the warning message about the learned road link Q1, and then providing the approach message that the subject vehicle has arrived at a proximity of the destination G. In such manner, the two guidance messages are securely provided including a warning message about the learned road link.

Based on the present disclosure, when the approach route does not correspond to the learned road link, but the exit route does correspond to the learned road link, route guidance may not provide a progress direction instruction for the branch point. On the other hand, the route guidance may provide the progress direction instruction for the branch point and an attention calling message regarding travel along the learned road link is provided.

When the subject vehicle approaches the branch point from the learned road link and then exits to the existing road link, the apparatus does not provide the progress direction for/at the branch point, in case the connection state of the learned road link to the branch point is uncertain. Further, if route guidance is provided into the learned road link when the subject vehicle enters the learned road link, guidance regarding the learned road link may not be provided again at a timing of traveling through the branch point, thereby advantageously preventing the user from feeling annoyance of redundant guidance.

Alternatively, when the subject vehicle approaches the branch point from the learned road link and then exits to the existing road link, an attention calling message regarding travel along the learned road link is performed in addition to providing a normal branch guidance for instructing the progress direction instruction. In such manner, based on the user's recognition about the uncertainty of the connection state of the learned road link to the branch point, the branch guidance is provided. Therefore, the route guidance for the branch point is prevented from being unclear by providing information in a positive manner.

Further, when the approach route does not correspond to a learned road link and the exit route does correspond to a learned road link, route guidance may be configured to provide an attention calling message regarding travel along the learned road link or provide a progress direction instruction for the branch point along with an attention calling message regarding travel along the learned road link.

When the subject vehicle approaches the branch point from the existing road link and then exits to the learned road link, by providing a warning or an attention calling message regarding travel along the learned road link the user may recognize that the connection state of the exit route as a learned road link at the branch point. At such time, in consideration of uncertainty of the connection state of such learned road link, the route guidance for the branch point is prevented from being unclear by not providing the progress direction instruction.

Alternatively, when the subject vehicle approaches the branch point from the existing road link and then exits to the learned road link, by presenting an attention calling message regarding travel along the learned road link in addition to providing a conventional progress direction instruction for the branch point, the user may recognize the uncertainty of the connection state of the learned road link to the branch point, before providing the branch guidance. In such case, by combining the attention calling with the conventional branch guidance, the route guidance for the branch point is prevented from being unclear.

Further, the subject vehicle may depart from the guidance route, which is provided as an off-route position, and later return to the guidance route, which is provided as an on-route position, during the route guidance. Once the subject vehicle returns to on-route position, a return point at which the subject vehicle returns to the guidance route may correspond to a learned road link. In such a case, the route guidance may provide an attention calling message regarding travel along the learned road link. In such manner, when the subject vehicle returns from the off-route position to the on-route position, the user may recognize that the connection state of the learned road link to which the subject vehicle has returned is uncertain.

Further, the approach route and the exit route respectively correspond to a learned road link, the route guidance may not provide a progress direction instruction for the branch point. Alternatively, the route guidance may provide a progress direction instruction for the branch point and an attention calling message regarding travel along the learned road.

When the subject vehicle approaches the branch point from one learned road link and then exits to another learned road link from the branch point, by refraining from providing the progress direction instruction, the route guidance for the branch point is prevented from being made unclear due to the uncertainty of the connection state of the learned road link at the branch point. Further, the annoyance of the user may also be prevented. Alternatively, by providing the attention calling message in addition to providing the normal branch guidance for instructing the progress direction, the user is notified that the connection state of the learned road link at the branch point is uncertain. In such case, by presenting the guidance information in a positive manner, the route guidance at the branch point is prevented from being ambiguous.

Further, a supplemental link may be provided as a new link extending along a base existing road link from one end of the learned road link to each end of the base existing road link. That is, the supplemental link may actually be a pair of new links, from one end of the learned road link, which is on a base link side of the learned road link, to both ends of the existing road link. The idea of using the supplement link is devised as a connection method for defining connectivity between a newly detected learned road link and the existing road link, without directly rewriting the data of the existing road. That is, the learned road link is added to the existing road link through the supplemental link.

In such manner, even when the learned road link is added to the data, the data of the existing road will not be modified, thereby making it easier for performing a version update of the ready-made map data.

Therefore, when the approach route corresponds to a supplemental link and the exit route does not correspond to a learned road link, the route guidance may be configured to provide an attention calling message regarding travel along the learned road. Alternatively, the route guidance may provide a progress direction instruction for the branch point and provide the attention calling message regarding travel along the learned road.

Further, when the approach route corresponds to the supplement link and the exit route does not correspond to a learned road link, the route guidance may provide a progress direction instruction for the branch point. Alternatively, the route guidance may provide a progress direction instruction for the branch point and provide the attention calling message regarding travel along the learned road.

Furthermore, when a distance from a first branch point of a route guidance object to a second branch point of a subsequent route guidance object is within a predetermined distance and the exit route from the second branch point corresponds to the learned road link, route guidance of the two branch points may be provided together. Specifically, the route guidance may provide an attention calling message regarding travel along a learned road, which is the exit route from the second branch point, simultaneously with a provision of the branch guidance for the first branch point.

In such manner, in a situation where two route guidance object branch points successively exist within a short distance, by combining the attention calling of the second branch point with the branch guidance for the first branch point, the interruption of two guidance messages during a short time, which may annoy the user, may be avoided.

Further, a user may request guidance information for a route guidance object that is on the guidance route and is closest to a current position of the subject vehicle. When such request is provided, route guidance for the branch point on the guidance route closet to the current position of the subject vehicle can be provided. In such manner, the branch guidance for the closest branch point provided at a user-specified timing is realized.

Further, when the request for providing route guidance is received and if the current position of the subject vehicle is on a learned road link, the route guidance provides an attention calling message regarding travel along the learned road. In such manner, at the user-specified timing, the attention calling message regarding travel along the learned road on which the subject vehicle is currently traveling is performed.

Furthermore, if there is other route guidance information that should be provided at a presentation timing of an attention calling message regarding travel along a learned road, such route guidance information may be provided at the presentation timing with the attention calling message. For instance, the route guidance may present the other route guidance information after presenting the attention calling message.

Although the present disclosure has been fully described in connection with the preferred embodiment thereof with reference to the accompanying drawings, it is to be noted that various changes and modifications will become apparent to those skilled in the art, and such changes and modifications are to be understood as being within the scope of the present disclosure as defined by the appended claims.

What is claimed is:

1. A navigation apparatus using ready-made map data and learned road data for providing route guidance when a subject vehicle is traveling, the learned road data including information regarding a learned road link, the learned road link being a road that is not included as an existing road link stored in the ready-made map data and being detected by a learned road detector, the navigation apparatus comprising:

a branch classification unit determining whether an approach route to a branch point and an exit route from the branch point respectively correspond to a learned road link in the learned road data; and a route guidance unit providing one of an existing road branch guidance and a learned road branch guidance being different from the existing road branch guidance, wherein the existing road branch guidance provides a progress direction as guidance at a predetermined timing before arriving at the branch point by using only the existing road link of the ready-made map data, when the branch classification unit determines that both the approach route to the branch point and the exit route from the branch point do not correspond to a learned road link, the learned road branch guidance provides guidance information reflecting the learned road link of the learned road data, when the branch classification unit determines that at least one of the approach route to the branch point and the exit route from the branch point corresponds to the learned road link, and the learned road detector generates a supplemental link as a new link that extends from one end of the learned road link to at least one end of the existing road link.

2. The navigation apparatus of claim 1, wherein
the route guidance unit provides the learned road branch guidance in a first mode or a second mode when the branch classification unit determines that the approach route corresponds to the learned road link of the learned road data and the exit route does not correspond to the learned road link, the first mode does not provide the progress direction for the branch point, and the second mode provides the progress direction for the branch point and a notification regarding travel along the learned road link.

3. The navigation apparatus of claim 1, wherein,
the route guidance unit provides the learned road branch guidance in a first mode or a second mode when the branch classification unit determines that the approach route does not correspond to the learned road link and the exit route corresponds to the learned road link, the first mode provides a notification regarding travel along the learned road link, and the second mode provides the route progress direction for the branch point and the notification regarding travel along the learned road link.

4. The navigation apparatus of claim 1 further comprising:
a return unit determining whether a return point of the subject vehicle returning to a guidance route corresponds to the learned road link of the learned road data, when the subject vehicle returns from an off-route position of the guidance route to an on-route position of the guidance route, wherein
the route guidance unit provides guidance that presents a notification regarding travel along the learned road link, when the return unit determines that the return point corresponds to the learned road link of the learned road data.

5. The navigation apparatus of claim 1, wherein
the route guidance unit provides the learned road branch guidance in a first mode or a second mode when the branch classification unit determines that the approach route and the exit route respectively correspond to learned road links of the learned road data, the first mode does not provide the progress direction for the branch point, and the second mode provides the progress direction for the branch point and a notification regarding travel along the learned road link.

6. The navigation apparatus of claim 1, wherein
the route guidance unit provides the learned road branch guidance in a first mode or a second mode when the branch classification unit determines that the approach route corresponds to the supplemental link and the exit route corresponds to the learned road link, the first mode provides a notification regarding travel along the learned road link, and the second mode provides the progress direction for the branch point and the notification regarding travel along the learned road link.

7. The navigation apparatus of claim 1, wherein
the learned road detector generates a supplemental link that extends from one end of the learned road link to at least one end of the existing road link, and the one end of the learned road link is disposed on an existing road link side of the learned road link, and
the route guidance unit provides the learned road branch guidance in a first mode or a second mode when the branch classification unit determines that the approach route corresponds to the supplemental link and the exit route does not correspond to the learned road link, the first mode does not provide the progress direction for the branch point, and the second mode provides the progress direction for the branch point and a notification regarding travel along the learned road link.

8. The navigation apparatus of claim 1 further comprising:
a successive branch guidance unit determining whether a distance between a first branch point of a route guidance object and a second branch point of a subsequent route guidance object is less than or equal to a predetermined distance, and whether the exit route from the second branch point corresponds to the learned road link of the learned road data, wherein
the route guidance unit presents a notification regarding travel along the learned road link that is the exit route from the second branch point with branch guidance for the first branch point when the successive branch guidance unit determines that the distance between the first branch point and the second branch point is less than or equal to the predetermined distance, and the exit route from the second branch point corresponds to the learned road link.

9. The navigation apparatus of claim 1 further comprising:
a guide request unit receiving an instruction for providing, when requested by a user, a route guidance for a route guidance object, the route guidance object being on the guidance route and in proximity to a current position of the subject vehicle, wherein
the route guidance unit provides the route guidance for the branch point on the guidance route that is closest to the current position of the subject vehicle based on a determination result by the branch classification unit, when the guide request unit receives the instruction for providing the route guidance.

10. The navigation apparatus of claim 9, wherein
the route guidance unit provides a notification regarding travel along the learned road link when the guide request unit receives the instruction for providing the route guidance and the current position of the subject vehicle is on the learned road link.

11. The navigation apparatus of claim 2 further comprising:
a message consolidation unit determining whether additional route guidance information should be provided at a presentation timing, the presentation time being the time at which a notification regarding travel along a learned road link is to be provided, wherein the route guidance unit provides the additional route guidance information after providing the notification, when the message consolidation unit determines that additional route guidance information should be provided at the presentation timing.

* * * * *